US009828880B2

(12) United States Patent
Ballard, Jr. et al.

(10) Patent No.: US 9,828,880 B2
(45) Date of Patent: Nov. 28, 2017

(54) METHOD AND APPARATUS TO IMPROVE HEAT TRANSFER IN TURBINE SECTIONS OF GAS TURBINES

(71) Applicant: General Electric Company, Schenectady, NY (US)

(72) Inventors: Henry Grady Ballard, Jr., Easley, SC (US); Ozgur Bozkurt, Greenville, SC (US); Kenneth Damon Black, Travelers Rest, SC (US); Radu Ioan Danescu, Greer, SC (US)

(73) Assignee: General Electric Company, Schenectady, NY (US)

( * ) Notice: Subject to any disclaimer, the term of this patent is extended or adjusted under 35 U.S.C. 154(b) by 765 days.

(21) Appl. No.: 13/843,016

(22) Filed: Mar. 15, 2013

(65) Prior Publication Data

US 2014/0271111 A1    Sep. 18, 2014

(51) Int. Cl.
*F01D 25/14*    (2006.01)
*F01D 25/26*    (2006.01)
*F01D 11/24*    (2006.01)

(52) U.S. Cl.
CPC .............. *F01D 25/26* (2013.01); *F01D 11/24* (2013.01); *F01D 25/14* (2013.01); *F05D 2260/22141* (2013.01); *Y02T 50/676* (2013.01)

(58) Field of Classification Search
CPC .......... F01D 25/08; F01D 25/10; F01D 25/12; F01D 25/14; F01D 25/145; F01D 25/26; F01D 11/24
See application file for complete search history.

(56) References Cited

U.S. PATENT DOCUMENTS

| | | | | |
|---|---|---|---|---|
| 4,841,726 A | * | 6/1989 | Burkhardt | F01D 11/24 415/116 |
| 4,844,688 A | * | 7/1989 | Clough | F01D 11/24 415/113 |
| 5,584,651 A | * | 12/1996 | Pietraszkiewicz | F01D 11/08 415/115 |

(Continued)

FOREIGN PATENT DOCUMENTS

| | | |
|---|---|---|
| EP | 1213444 A2 | 6/2002 |
| EP | 2518278 A1 | 10/2012 |
| WO | 9217686 A1 | 10/1992 |

OTHER PUBLICATIONS

U.S. Appl. No. 13/461,035, filed May 1, 2012, Ballard, Jr.

*Primary Examiner* — Bryan Lettman
(74) *Attorney, Agent, or Firm* — Fletcher Yoder, P.C.

(57) ABSTRACT

A gas turbine engine system having a combustion section and a turbine section is provided. The turbine section includes at least one turbine stage having a plurality of turbine blades coupled to a rotor and an inner casing circumferentially disposed about the plurality of turbine blades. The turbine section includes an outer casing circumferentially disposed about at least a portion of the inner casing. The inner casing and the outer casing define a cavity comprising a volume configured to facilitate the distribution of air within the cavity to cool an outer surface of the inner casing and an inner surface of the outer casing. The outer casing comprises at least one air inlet and the inner casing comprises at least one air outlet. At least one flange is provided within the cavity, and the at least one flange flanks the air inlet and at least one flow guide.

20 Claims, 11 Drawing Sheets

(56) References Cited

U.S. PATENT DOCUMENTS

| | | | | |
|---|---|---|---|---|
| 5,605,438 | A * | 2/1997 | Burdgick | F01D 25/145 415/182.1 |
| 6,179,557 | B1 * | 1/2001 | Dodd | F01D 9/00 415/108 |
| 6,227,800 | B1 | 5/2001 | Spring et al. | |
| 7,269,955 | B2 * | 9/2007 | Albers | F01D 5/082 60/728 |
| 9,157,331 | B2 * | 10/2015 | Laurello | F01D 11/24 |
| 2009/0165301 | A1 * | 7/2009 | Broomer | B23P 6/005 29/890.08 |
| 2011/0027068 | A1 * | 2/2011 | Floyd, II | F01D 11/24 415/13 |
| 2013/0266418 | A1 * | 10/2013 | Snook | F01D 11/24 415/1 |
| 2014/0099190 | A1 * | 4/2014 | Meyer | F01D 25/14 415/116 |
| 2014/0234073 | A1 * | 8/2014 | Moreton | F01D 9/00 415/1 |

* cited by examiner

METHOD AND APPARATUS TO IMPROVE HEAT TRANSFER IN TURBINE SECTIONS OF GAS TURBINES

BACKGROUND

The subject matter disclosed herein relates generally to gas turbines, and, more particularly to systems and methods for optimizing heat transfer in turbine sections of gas turbines.

A gas turbine engine combusts a fuel to generate hot combustion gases, which flow through a turbine to drive a load and/or a compressor. In such systems, the combustion generates a significant amount of heat. This heat can cause thermal expansion, as well as potential stress or wear to various components within the gas turbine engine. For example, the thermal expansion may alter the clearance between stationary and rotating components, such as turbine blades. Accordingly, it may be desirable to control the temperature of various turbine components to optimize the clearance, increase performance, and increase the life of the gas turbine engine.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system comprising a gas turbine engine is provided. The gas turbine engine includes a combustion section and a turbine section coupled to the combustion section. The turbine section includes at least one turbine stage having a plurality of turbine blades coupled to a rotor and an inner casing circumferentially disposed about the plurality of turbine blades. The turbine section also includes an outer casing circumferentially disposed about at least a portion of the inner casing. The inner casing and the outer casing define a cavity between the inner casing and the outer casing, the cavity comprising a volume extending between a forward portion and an aft portion to facilitate distribution of air within the cavity to cool an outer surface of the inner casing and an inner surface of the outer casing. The forward portion is closer to the combustion section than the aft portion. The outer casing includes at least one air inlet for the air to flow into the aft portion of the cavity, and the inner casing comprises at least one air outlet for the air to flow out of the forward portion of the cavity. The gas turbine engine also includes at least one flange disposed within the cavity, and the at least one flange flanks the at least one air inlet and at least one flow guide. The at least one flange and the at least one flow guide each extend axially in a longitudinal direction of the turbine section along at least a portion of the outer surface of the inner casing. The at least one flow guide is configured to change a velocity or a direction of an air flow within the cavity to facilitate cooling of the outer surface of the inner casing and the inner surface of the outer casing.

In another embodiment, a system including a cooling assembly for a turbine section of a gas turbine is provided. The cooling assembly includes an inner casing having a first inner surface and a first outer surface, the inner casing being circumferentially disposed about a portion of the turbine section of a gas turbine. The cooling assembly further includes an outer casing having a second inner surface and a second outer surface, the outer casing being circumferentially disposed about at least a portion of the inner casing. A cavity is defined by the first outer surface of the inner casing and the second inner surface of the outer casing, and the cavity extends circumferentially around the portion of the turbine section of the gas turbine. The cavity has a volume configured to facilitate an air flow within the cavity to cool the first outer surface of the inner casing and the second inner surface of the outer casing, and the cavity includes a plurality of inlets configured to receive air proximate to a first end of the cavity, wherein the inlets are distributed circumferentially about the cavity. The cavity also includes a plurality of outlets configured to exhaust air into a nozzle proximate to a second end of the cavity, wherein the outlets are distributed circumferentially about the cavity. The cavity further includes a plurality of flanges extending axially in a longitudinal direction of the turbine section along at least a portion of the first outer surface of the inner casing, wherein each pair of adjacent flanges of the plurality of flanges flanks at least two flow guides.

In another embodiment, a method is provided. The method includes routing air through an inlet disposed proximate a first end of a cavity formed between an inner casing and an outer casing of a turbine section of a gas turbine, wherein the cavity has a volume configured to facilitate cooling of the inner casing and the outer casing. The method also includes routing the air around a plurality of surface features within the cavity, wherein the surface features include at least one flow guide extending axially from an outer surface of the inner casing, the at least one flow guide being flanked by at least two flanges. The method further includes routing the air through at least one outlet disposed proximate to a second end of the cavity into a turbine nozzle.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
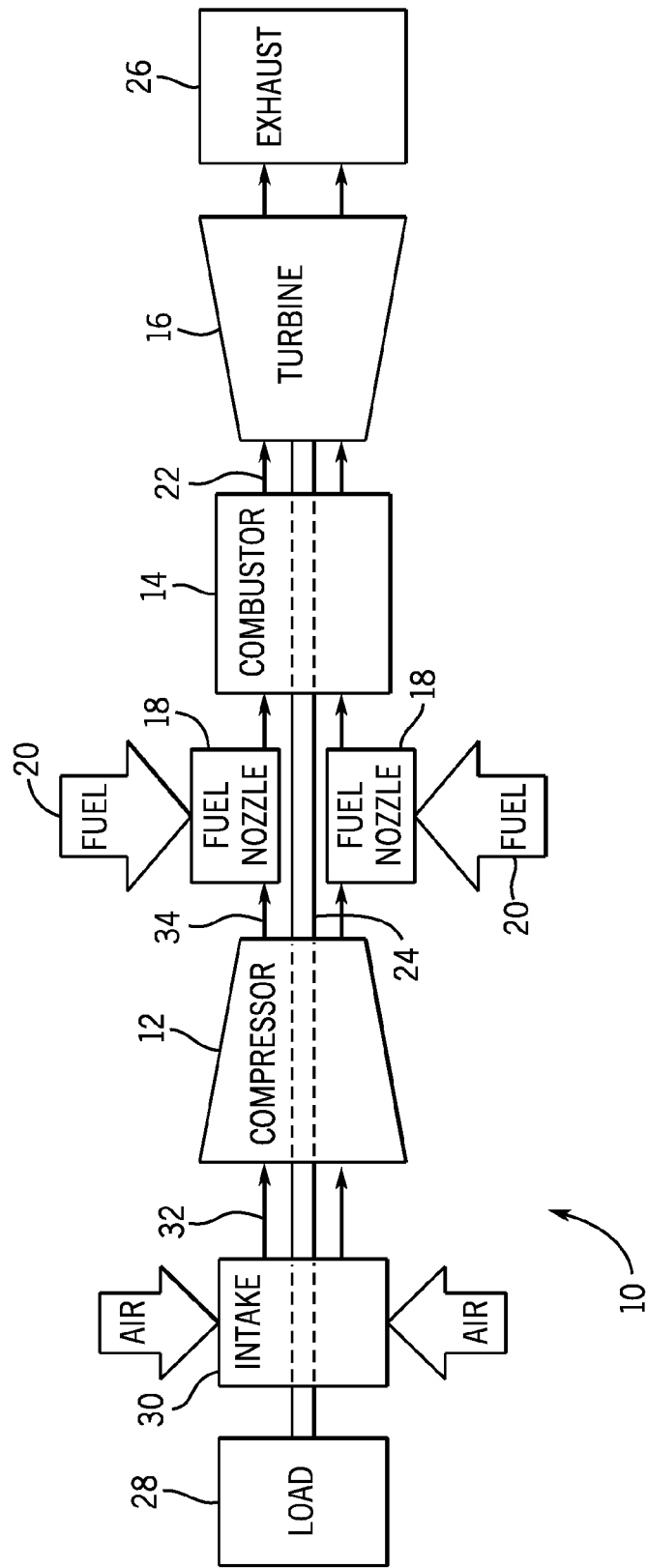
FIG. 1 is a block diagram of an embodiment of a gas turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Gas turbine systems in accordance with the present disclosure may optimize heat transfer and provide cooling within a turbine section of a gas turbine engine with or without certain types of hardware, such as impingement plates and/or flow sleeves. Certain gas turbine systems may include impingement plates and flow sleeves positioned adjacent to casings (e.g., shrouds) of the turbine section to cool the casings. However, such components add additional complexity, as well as additional cost, to the gas turbine system. Thus, the present disclosure provides embodiments of systems and methods for cooling the turbine section that do not require impingement plates and/or flow sleeves adjacent to the casings or within cavities formed by the casings. More particularly, the cavities described herein may have a geometry and/or a volume (e.g., a reduced volume or a relatively small volume as compared with other gas turbine systems) to facilitate the flow of a cooling fluid (e.g., air) within the cavity and to optimize heat transfer within the cavity between the casings of the turbine section. Additionally, the casings and cavity may include various structural features (e.g., flow guides, distributors, straighteners, spreaders, etc.) that are configured to facilitate the flow of air and optimize heat transfer within the cavity. Examples of such structural features include, but are not limited to, flanges, false flanges, protrusions (e.g., circumferential ribs or overlapping protrusions), slots, and perforated plates. Cavities having the geometry and structural features described herein may provide adequate cooling to the casings of the turbine section without the need for impingement plates and/or flow sleeves, which in turn may provide various advantages. For example, the systems described herein may reduce manufacturing costs, as well as repair costs. Further, optimal heat transfer of the turbine section may reduce the possibility of damage to turbine components and may help maintain acceptable radial and axial clearances between certain components (e.g., clearance between an inner casing and turbine blades, bucket tips and shrouds, bucket angel wings and nozzles). More specifically, the systems described in the present disclosure may enable control of the cooling of the casings, and thus may enable control of the radial and axial clearances between the turbine blades and the casings to improve engine performance.

Turning to the drawings, FIG. 1 illustrates a block diagram of an embodiment of a gas turbine system 10, which may include features (e.g., cooling features) to improve heat transfer within certain portions of the system 10. As appreciated, the systems and methods described herein may be used in any turbine system, such as gas turbine systems and steam turbine systems, and is not intended to be limited to any particular machine or system. As shown, the system 10 includes a compressor 12, a turbine combustor 14, and a turbine 16. The system 10 may include one or more combustors 14 that include one or more fuel nozzles 18 configured to receive a liquid fuel and/or gas fuel 20, such as natural gas or syngas.

The turbine combustors 14 ignite and combust a fuel-air mixture, and then pass hot pressurized combustion gases 22 (e.g., exhaust) into the turbine 16. Turbine blades are coupled to a shaft 24, which is also coupled to several other components throughout the turbine system 10. As the combustion gases 22 pass through the turbine blades in the turbine 16, the turbine 16 is driven into rotation, which causes the shaft 24 to rotate. Eventually, the combustion gases 22 exit the turbine system 10 via an exhaust outlet 26. Further, the shaft 24 may be coupled to a load 28, which is powered via rotation of the shaft 24. For example, the load 28 may be any suitable device that may generate power via the rotational output of the turbine system 10, such as an electrical generator, a propeller of an airplane, and so forth.

Compressor blades may be included as components of the compressor 12. The blades within the compressor 12 are coupled to the shaft 24, and will rotate as the shaft 24 is driven to rotate by the turbine 16, as described above. An intake 30 feeds air 32 into the compressor 12, and the rotation of the blades within the compressor 12 compress the air 32 to generate pressurized air 34. The pressurized air 34 is then fed into the fuel nozzles 18 of the turbine combustors 14. The fuel nozzles 18 mix the pressurized air 34 and fuel 20 to produce a suitable mixture ratio for combustion (e.g., a combustion that causes the fuel to more completely burn) so as not to waste fuel or cause excess emissions. As described in more detail below, the system 10 may include certain features to improve heat transfer and to cool at least a portion of the turbine 16 in the absence of certain types of hardware, such as impingement plates and/or flow sleeves, adjacent to certain casings or within cavities formed by the casings.

Figure 2:
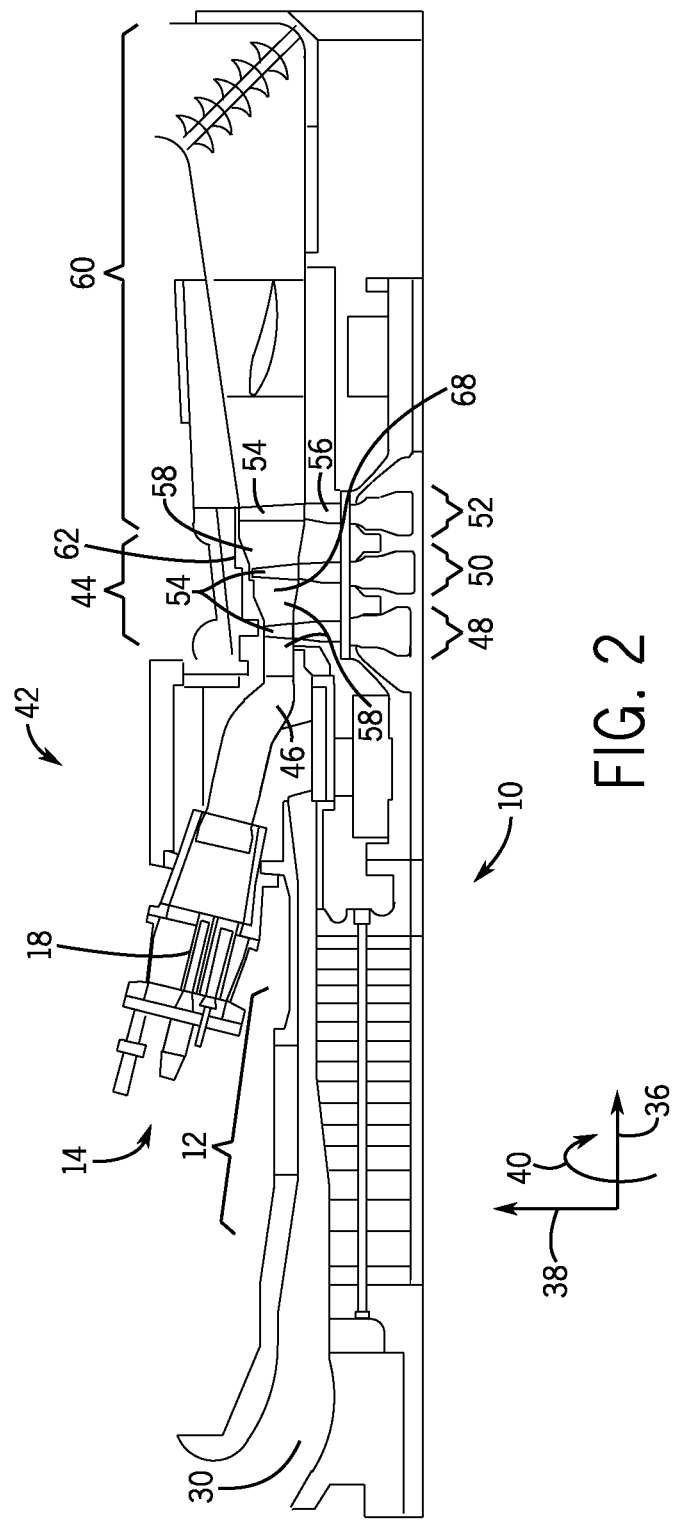
FIG. 2 is a partial side cross-sectional view of a gas turbine engine.

FIG. 2 is a partial cross-sectional side view of an embodiment of a gas turbine system 10. As shown, the gas turbine system 10 may be described with reference to a longitudinal axis or direction 36, a radial axis or direction 38, and a circumferential axis or direction 40. The gas turbine system 10 includes one or more fuel nozzles 18 located inside a combustor section 42. Further, each combustor 14 may include multiple fuel nozzles 18 attached to or near the head end of each combustor 14 in an annular or other arrangement.

Air enters through the air intake section 30 and is compressed by the compressor 12. The compressed air from the compressor 12 is then directed into the combustor section 42, where the compressed air is mixed with fuel. The mixture of compressed air and fuel is generally burned within the combustor section 42 to generate high-temperature, high-pressure combustion gases, which are used to generate torque within the turbine 16 (e.g., one or more turbine stages), which is part of a turbine section 44. Fluid within the turbine 16 may generally flow in the direction of the longitudinal axis 36. As noted above, multiple combustors 14 may be annularly disposed along the circumferential axis 40 within the combustor section 42. Each combustor 14 includes a transition piece 46 that directs the hot combustion gases from the combustor 14 to the turbine 16. In particular, each transition piece 46 generally defines a hot gas path from the combustor 14 to a nozzle assembly of the turbine section 16, included within a first stage 48 of the turbine 16.

As depicted, the turbine 16 includes three separate turbine stages 48, 50, and 52 in the turbine 16. Although three stages are shown, any suitable number of stages may be provided. For example, 1, 2, 3, 4, 5, 6, 7, 8, 9, 10, or more stages may be included in the turbine 16. Each stage 48, 50, and 52 includes a plurality of blades 54 coupled to a rotor wheel 56 rotatably attached to the shaft 24 (see FIG. 1). Each stage 48, 50, and 52 also includes a nozzle assembly 58 disposed directly upstream of each set of blades 54. The nozzle assemblies 58 direct the hot combustion gases toward the blades 54 where the hot combustion gases apply motive forces to the blades 54 to rotate the blades 54, thereby turning the shaft 24. The hot combustion gases flow through each of the stages 48, 50, and 52 applying motive forces to the blades 54 within each stage 48, 50, and 52. The hot combustion gases may then exit the gas turbine 16 through an exhaust diffuser section 60. The exhaust diffuser section 60 functions by reducing the velocity of fluid flow through the diffuser section 60, while also increasing the static pressure to increase the work produced by the gas turbine system 10.

As illustrated, an inner casing 62 is disposed about at least a portion of the turbine 16. More particularly, the inner casing 62 is disposed about at least a portion of the turbine 16, and an outer casing 64 is disposed about at least a portion of the inner casing 62 in a concentric or coaxial arrangement. Together, the inner casing 62 and the outer casing 64 define a cavity 66. The cavity 66 is configured to receive a cooling fluid (e.g., air), and to direct the air into a nozzle plenum of the turbine 16. In some embodiments, the nozzle plenum is a second stage 50 nozzle plenum 68 of the turbine 16.

Figure 3:
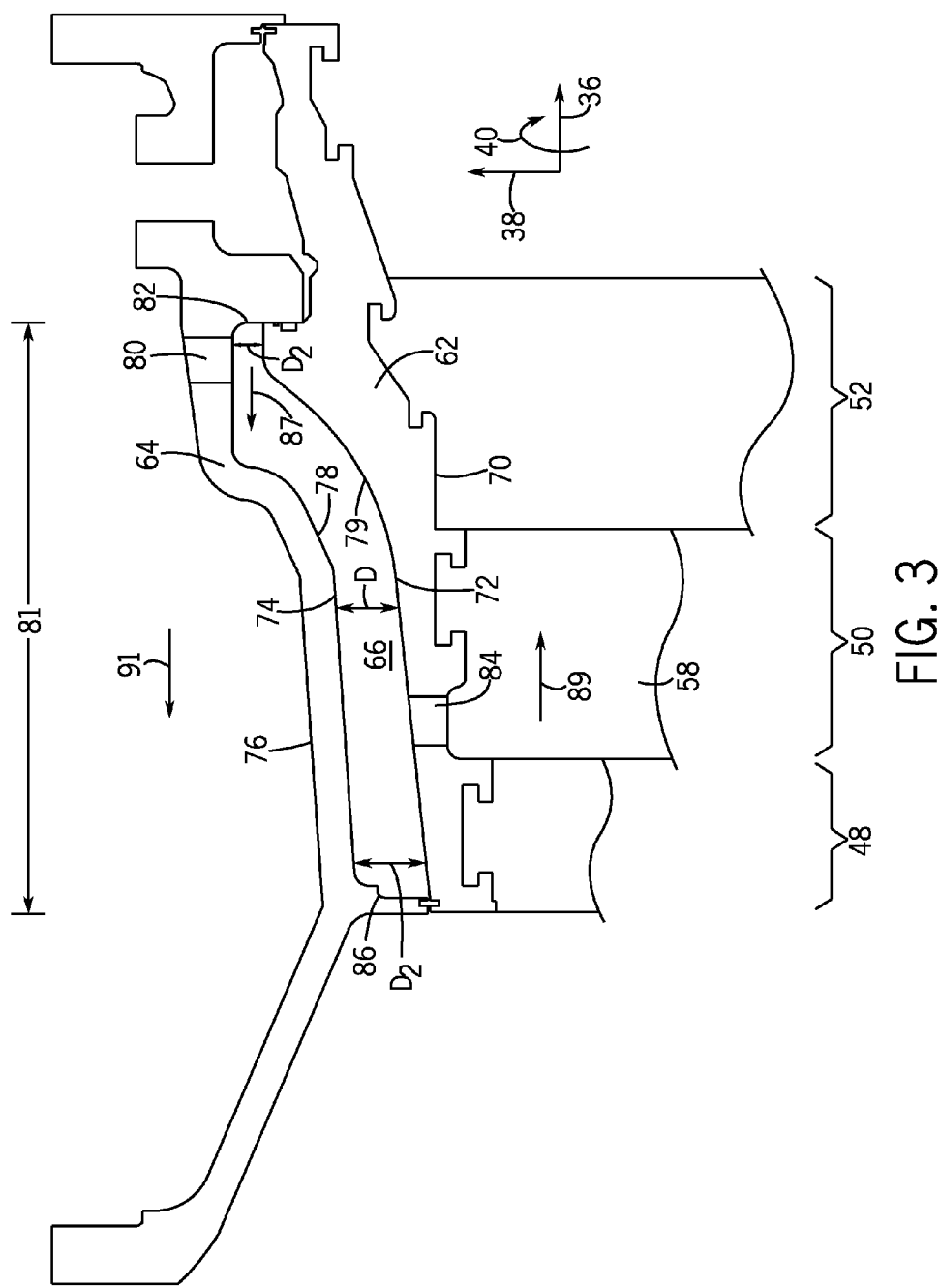
FIG. 3 is a side cross-sectional view of an embodiment of an inner casing and an outer casing of a turbine section of the gas turbine of FIGS. 1 and 2.

As shown in FIG. 3, the inner casing 62, the outer casing 64, and/or the cavity 66 may have a configuration and/or features to facilitate cooling of the turbine 16 of the gas turbine system 10. For example, the cavity 66 may have a geometry and/or a volume (e.g., a reduced volume or relatively small volume) to facilitate the flow of a cooling fluid (e.g., air) within the cavity 66 and to improve heat transfer within the cavity 66 between the casings 62, 64. Additionally, the casings 62, 64 and cavity 66 may include various structural features (e.g., flow guides, distributors, straighteners, spreaders, etc.) that are configured to facilitate the flow of air and optimize heat transfer within the cavity 66. Examples of such structural features include, but are not limited to, flanges, false flanges (e.g., longitudinal ribs), protrusions (e.g., circumferential ribs or overlapping protrusions), slots, and perforated plates. The configuration of the inner casing 62, the outer casing 64, and/or the cavity 66 may improve heat transfer within at least a portion of the turbine section 44 without the need for impingement plates and/or flow sleeves or other structural features (e.g., flow guides, distributors, straighteners, spreaders, etc.). Additionally, the configuration may enable the system 10 to maintain appropriate radial and axial clearances between certain components of the turbine section 44.

More particularly, the configuration of the inner casing 62, the outer casing 64, and/or the cavity 66 may enable control of the cooling of the outer surface 72 of the inner casing 62 and the inner surface 74 of the outer casing 64, which in turn may enable control of the radial clearance between the turbine blades 54 and the casings 62, 64, for example. Providing improved heat transfer circumferentially about the casings 62, 64 may reduce distortion of the casings 62, 64 and maintain appropriate radial clearances. Additionally, the configuration of the inner casing, 62, the outer casing, 64, and/or the cavity 66 may improve heat transfer axially along the casings 62, 64 and may improve the thermal response of the casings 62, 64 and maintain appropriate axial clearances. Furthermore, the improved heat transfer provided may also reduce any bending of a stator tube and may result in improved engine performance.

As described above, the turbine section 44 of the gas turbine system 10 includes a plurality of stages 48, 50, 52. The inner casing 62 is disposed about (e.g., circumferentially 40 surrounds) at least some of the turbine blades 54 of each stage 48, 50, 52. The outer casing 64 is disposed about (e.g., circumferentially 40 surrounds) at least a portion of the inner casing 62. The inner casing 62 has an inner surface 70 and an outer surface 72. Similarly, the outer casing 64 has an inner surface 74 and an outer surface 76. As discussed above, the inner casing 62 and the outer casing 64 define the cavity 66. More particularly, the outer surface 72 of the inner casing 62 and the inner surface 74 of the outer casing 64 define the cavity 66. The cavity 66 is generally configured to receive air, and the air flows within the cavity 66 to facilitate heat transfer between the casings 62, 64 (e.g., to cool the inner casing 62 and the outer casing 64). Again, more particularly, the air flows within the cavity 66 adjacent to the outer surface 72 of the inner casing 62 and the inner surface 74 of the outer casing 64.

As shown, the outer casing 64 includes at least one inlet 80 (e.g., air inlet) extending between the inner surface 74 and the outer surface 76 of the outer casing 64, and the at least one inlet 80 is configured to receive and/or to direct air into the cavity 66. The at least one inlet 80 may be disposed proximate (e.g., near) to a first end 82 (e.g., aft portion or end) of the cavity 66. Although only one inlet 80 is shown in the illustrated portion of the outer casing 62, it should be understood that more than one inlet 80 may be provided in this portion of the outer casing 62, and multiple inlets 80 may be positioned circumferentially about the turbine 16. Additionally, the inner casing 62 includes at least one outlet 84 (e.g., air outlet) extending between the inner surface 70 and the outer surface 72 of the inner casing 62. The at least one outlet 84 may be disposed proximate to a second end 86 (e.g., forward portion or end) of the cavity 66, and the at least one outlet 84 may be configured to direct air from the cavity 66 into a nozzle plenum of the turbine 16. As noted above, in some embodiments, the nozzle plenum is the second stage nozzle plenum 68. The air may flow through the cavity 66 from the at least one inlet 80 to the at least one outlet 84, and may flow generally in a direction (as shown by arrow 87) opposite to the direction (as shown by arrow 89) of a flow of a working fluid (e.g., hot combustion gas) within the turbine 16.

As illustrated, the cavity 66 may have a generally elongated cross-sectional geometry. In certain embodiments, the inner surface 74 of the outer casing 64 may have a generally convex curvature (or at least a portion 78 of the inner surface 74 of the outer casing 64 may have a generally convex curvature) that curves (e.g., turns) toward the outer surface 72 of the inner casing 62 and toward the longitudinal axis 36.

In certain embodiments, the outer surface 72 of the inner casing 62 may have a generally concave curvature (or at least a portion 79 of the outer surface 72 of the inner casing 62 may have a generally concave curvature) that curves (e.g., turns) away from the inner surface 74 of the outer casing 64 and toward the longitudinal axis 36. In other words, the outer surface 72 of the inner casing 62 gradually curves (e.g., turns) inwardly toward the longitudinal axis 36 in an upstream direction 91 relative to the flow 89 of the working fluid in the turbine 16 between the first end 82 and the second end 86 of the cavity, or between the inlet 80 and the outlet 84. Additionally, the inner surface 74 of the outer casing 64 gradually curves (e.g., turns) inwardly toward the longitudinal axis 36 in the upstream direction 91 relative to the flow 89 of the working fluid in the turbine 16 between the first end 82 and the second end 86 of the cavity, or between the inlet 80 and the outlet 84. As shown, the outer surface 72 of the inner casing 62 is or curves closer to the longitudinal axis 36 in the upstream direction 91, or the outer surface 74 of the inner casing 64 is closer to the longitudinal axis 36 at the second end 86 than at the first end 82 of the cavity 66. Similarly, the inner surface 74 of the outer casing 64 is or curves closer to the longitudinal axis 36 in the upstream direction 91, or the outer surface 74 of the inner casing 64 is closer to the longitudinal axis 36 at the second end 86 than at the first end 82 of the cavity 66.

Additionally, in some embodiments, the outer surface 72 of the inner casing 62 and the inner surface 74 of the outer casing 64 may be disposed a distance D from one another (e.g., an orthogonal distance between the surfaces 72, 74). More particularly, at the first end 82 of the cavity 66, the outer surface 72 of the inner casing 62 and the inner surface 74 of the outer casing 64 may be disposed at a distance $D_1$ from one another. In some embodiments, $D_1$ may be between approximately 2 cm to 25 cm, 5 cm to 20 cm, 7 cm to 15 cm, or $D_1$ may be about 10 cm. In some embodiments, at the second end 86 of the cavity 66, the outer surface 72 of the inner casing 62 and the inner surface 74 of the outer casing 64 may be disposed at a distance $D_2$ from one another. In some embodiments, $D_2$ may be between about approximately 2 centimeters (cm) to 25 cm, 5 cm to 20 cm, 7 cm to 15 cm, or $D_2$ may be about 10 cm. In some embodiments, the distance D (e.g., $D_1$ and $D_2$) between the surfaces 72, 74 of the casings 62, 64 is substantially the same at both the first end 82 and the second end 86 of the cavity 66. For example, the distances $D_1$ and $D_2$ between the surfaces 72, 74 of the casings 62, 64 at the first end 82 and at the second end 86 of the cavity 66 may vary by less than between about 0 to 20%, 0 to 15%, 0 to 10%, or 0 to 5%. In some embodiments, the distances $D_1$ and $D_2$ between the surfaces 72, 74 of the casings 62, 64 at the first end 82 and at the second end 86 of the cavity 66 may vary by less than about 20%, 15%, 10%, 5%, 4%, 3%, 2%, 1%. In certain embodiments, $D_1$ and $D_2$ are both between approximately 10 cm and 11 cm.

Further, in some embodiments, the distance D between the surfaces 72, 74 is substantially the same along a length 81 of the cavity 66. For example, the distance D between the surfaces 72, 74 along the length 81 of the cavity 66 may vary by less than about 0 to 20%, 0 to 15%, 0 to 10%, or 0 to 5%. In some embodiments, the distance D between the surfaces 72, 74 along the length 81 of the cavity 66 may vary by less than about 20%, 15%, 10%, 5%, 4%, 3%, 2%, 1%. The cavity 66 may have any suitable length 81, although in certain embodiments the cavity 66 may have a length 81 of between approximately 30 cm to 150 cm, 50 to 100 cm, or 80 to 90 cm. Such a configuration also results in the cavity 66 having a relatively small volume (e.g., as compared with other turbine engines). The relatively small volume of the cavity 66 may facilitate the flow of air within the cavity 66 that results in improved heat transfer and cooling of the surfaces 72, 74 that define the cavity 66 without the need for additional hardware, such as impingement plates and/or flow sleeves, in the cavity 66.

Figure 4:
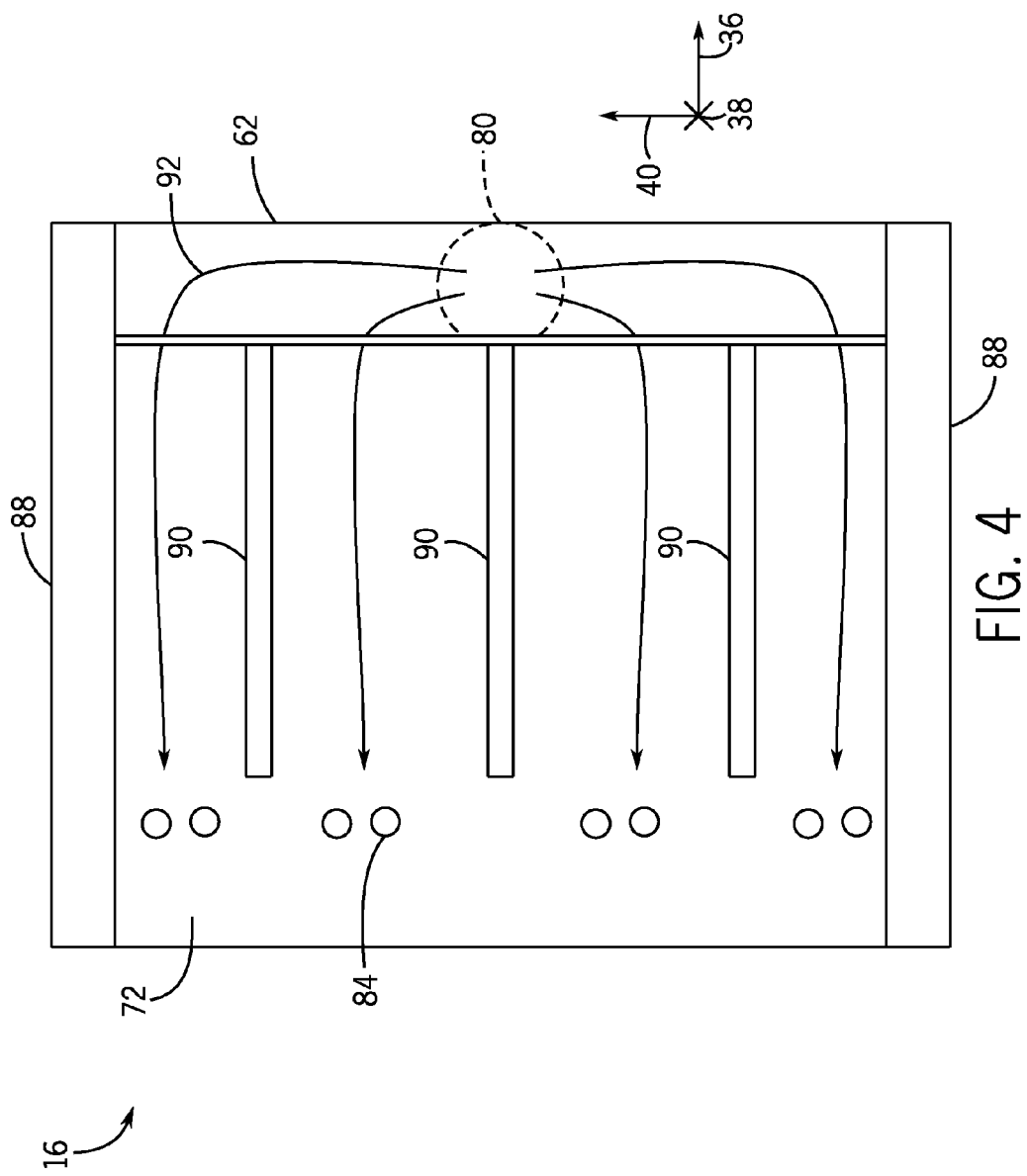
FIG. 4 is a schematic top view of an embodiment of a portion of the inner casing.

FIG. 4 illustrates a schematic top view of an embodiment of a portion of the inner casing 62, wherein the inner casing 62 is not covered by the outer casing 64 (e.g., the inner casing 62 is unwrapped). As shown, multiple outlets 84 may be formed in the inner casing 62, and the outlets 84 may extend through the inner casing 62 to flow air into the nozzle plenum assembly 58. At least one inlet 80 (shown in dotted lines to indicate the relative placement of the inlet 80 with respect to the features of the inner casing 62) may be provided to flow air through the outer casing 64 into the cavity 66 and along the outer surface 72 of the inner casing 62 as shown by arrows 92. Additionally, as shown, a flange 88 (e.g., a bolted flange) may be disposed on and may extend from the inner casing 62. More particularly, the flange 88 may extend radially 38 outwardly from the outer surface 72 of the inner casing 62 (e.g., the flange 88 may extend radially outwardly toward the outer casing 64 and/or into the cavity 66 when the outer casing 64 is coupled to the inner casing 62).

As illustrated in FIG. 4, at least one flow guide 90 (e.g., false flange, protrusion extending in the longitudinal direction 36) may be disposed on the outer surface 72 of the inner casing 62. Like the flange 88, the false flange 90 may extend radially 38 outwardly from the outer surface 72 of the inner casing 62 (e.g., the flange 88 may extend radially 38 outwardly toward the outer casing 64 and/or into the cavity 66 when the outer casing 64 is coupled to the inner casing 62). However, the false flange 90 may be generally smaller (e.g., have smaller dimensions in the longitudinal direction 36, radial direction 38, and/or circumferential direction 40) than the flange 88. In some embodiments, the false flanges 88 may be disposed on the inner surface 74 or the outer casing 64 and may extend radially inwardly from the inner surface 74 of the outer casing 64. As described in more detail below, the false flanges 90 provide additional surface area within the cavity 66 and may generally guide and distribute the air flow in the cavity 66 between the inlets 80 and the outlets 84. Thus, the false flanges 90 may also contribute to improved heat transfer within the cavity 66.

As shown, a pair of flanges 88 (e.g., adjacent flanges 88) may flank (e.g., may be positioned on opposite sides from) at least one inlet 80 and at least one outlet 84. Additionally, each adjacent pair of flanges 88 may flank (e.g., may be positioned on opposite sides from) at least one false flange 90. In the illustrated embodiment, the pair of flanges 88 flanks (e.g., is positioned on opposite side from) one air inlet 80, eight outlets 84, and three false flanges 90. However, the pair of flanges 88 may flank 1, 2, 3, 4, 5, 6, 7, 8, 9, 10, or more false flanges 90. Similarly, the pair of flanges 88 may flank 1, 2, 3, 4, 5, 6, 7, 8, 9, 10 or more inlets 80. Additionally, the pair of flanges 88 may flank about 2, 4, 6, 8, 10, 12, 14, 16, 18, 20, or more outlets 84. Further, 2, 4, 6, 8, 10 or more flanges 88 may be provided about the turbine 16, and each pair of flanges 88 may flank various components or features. The pattern or arrangement of inlets 80, outlets 84, flanges 88, and false flanges 90 (e.g., the arrangement of features may be repeated on other portions of the inner casing 62 circumferentially surrounding the turbine 16) depicted in the portion of the inner casing 62 of FIG. 4 may be repeated in other portions of the inner casing 62 about the turbine 16. For example, if the arrangement depicted in the portion of the inner casing 62 shown in FIG. 4 is repeated about the turbine 16, then the inner casing 62 of the turbine section 44 may include eight flanges 88, eight inlets 80, 64 outlets 84, and 24 false flanges 90.

Figure 5:
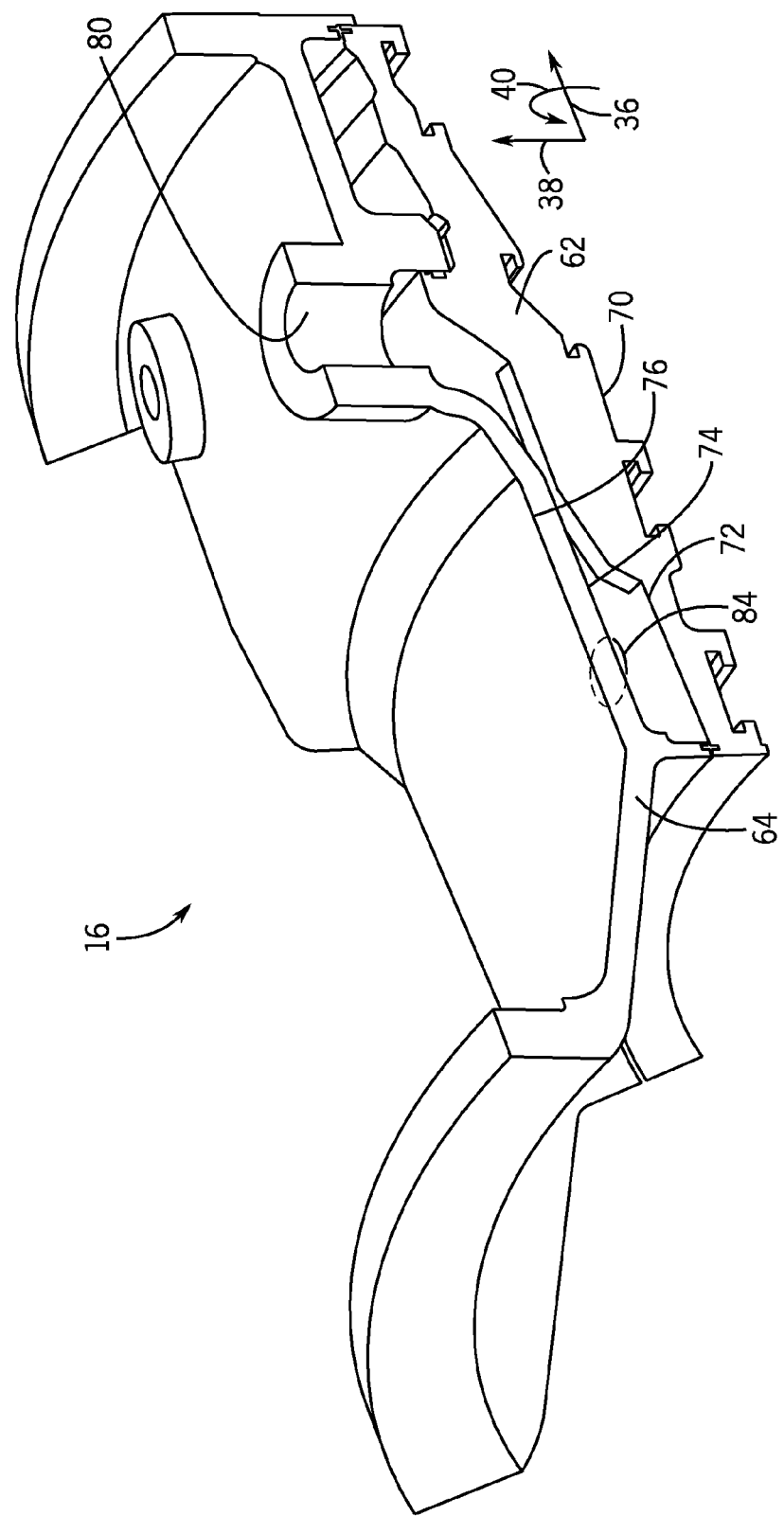
FIG. 5 is a partial perspective view of an embodiment of a portion of the outer casing disposed about the inner casing.

FIG. 5 illustrates a cutaway perspective view of an embodiment of the outer casing 64 disposed about the inner casing 62. As shown, the outer casing 64 is coupled to (e.g., disposed circumferentially about) the inner casing 62, and the casings 62, 64 define the cavity 66. Air may flow into the cavity 66 via inlet 80, and air may exit the cavity 66 via outlet 84. The outer casing 64 may have shape that generally corresponds to the inner casing 62, enabling the casings 62, 64 to be coupled together.

Figure 6:
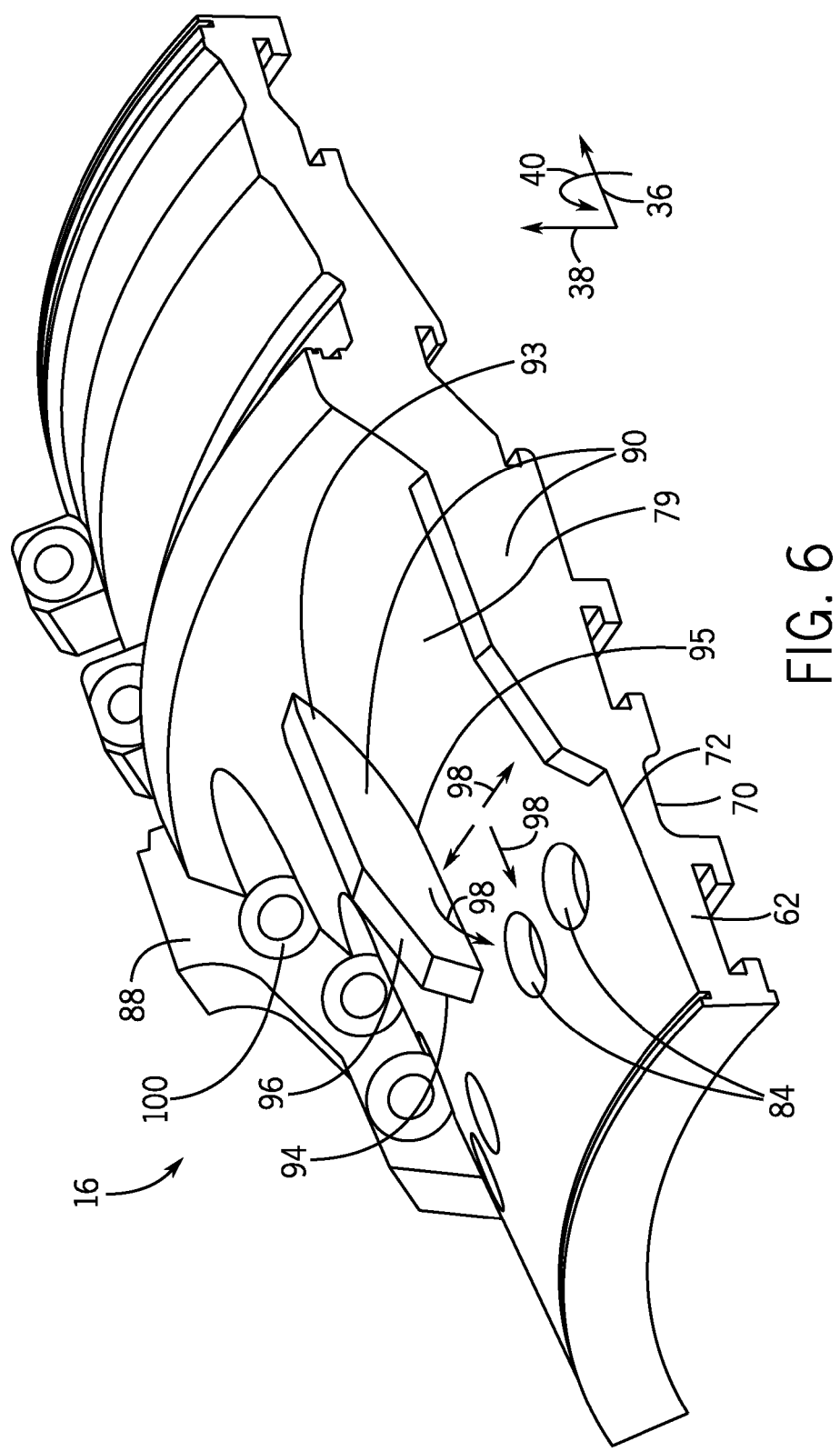
FIG. 6 is a perspective view of an embodiment of the inner casing having one flange and multiple false flanges.

As mentioned above, the cavity 66 may include various structural features configured to affect and/or to control the flow of air within the cavity 66, which in turn may result in improved cooling and heat transfer within the cavity 66. Examples of these features are depicted in FIGS. 6-11 and are described in detail below. It should be understood that the examples provided herein are not intended to be limiting, and any suitable configuration and surface feature to improve heat transfer within the cavity 66 is envisioned. With the foregoing in mind, FIG. 6 is a partial perspective view of the inner casing 62 having false flanges 90. As mentioned above, the false flanges 90 may be an elongated protrusion extending in the longitudinal direction 36 from a first end 93 to a second end 94 and protruding radially 38 outwardly from the outer surface 72 of the inner casing 62. The false flanges 90 may vary in height between the first end 93 and the second end 94. In certain embodiments, the false flanges 90 may have a curvature 95 that corresponds to the concave curvature of the portion 79 of the outer surface 72 of the inner casing 62. The false flanges 90 may have a portion 96 that tapers toward the outer surface 72 of the inner casing 62 (e.g., has a reduced height or protrusion in the radial direction 38) to particularly guide, distribute, and/or control air flow within the cavity 66.

In certain embodiments, one or more false flanges 90 may be disposed on the outer surface 72 of the inner casing 62, and may extend radially 38 outward toward the outer casing 64 and/or into the cavity 66. Although two false flanges 90 are depicted, any suitable number of false flanges 90 may be provided within the cavity 66. For example, 1, 2, 3, 4, 5, 6, 7, 8, 9, 10, 11, 12, 13, 14, 15, 16, 17, 18, 19, 20, or more false flanges 90 may be provided about the turbine 16. Regardless of the particular configuration and/or number of false flanges 90, each false flange 90 is configured to change the velocity and/or direction of an air flow (e.g., to guide, distribute, and/or control air flow) within the cavity 66 to facilitate cooling of the outer surface 72 of the inner casing 62 and an inner surface 74 of the outer casing 64. FIG. 6 also illustrates that the flange 88 may flank the false flanges 90, and the flange 88 include at least one aperture 100 (e.g., hole, cavity, etc.), which is configured to receive a fastener (e.g., a bolt) to facilitate coupling of the inner casing 62 and the outer casing 64. As shown, the false flanges 90 may not include any apertures, but rather may form solid ribs extending in the longitudinal direction 36 within the cavity 66.

Air within the cavity 66 may flow in multiple directions as shown by arrows 98 (e.g., the air flow may have components in the longitudinal direction 36, the radial direction 38, and/or the circumferential direction 40). In particular, the air may flow toward, against, and around the various features within the cavity 66. For example, as shown in FIG. 6, the air may flow toward, against, and around the flange 88 and the false flanges 90. The false flanges 90 extend between the first end 93 and the second end 94 in the longitudinal direction 36 and protrude radially 38 outwardly, thus serving as an axial flow guide and helping guide and control the air flow distribution more evenly in the upstream direction from the inlet 80 to the outlet 84. The flange 88 and the false flange 90 (along with the geometry and/or the volume of the cavity and other surface features within the cavity, in some embodiments) may be configured to affect the direction and/or velocity of air flow and to optimize heat transfer within the cavity 66.

Figure 7:
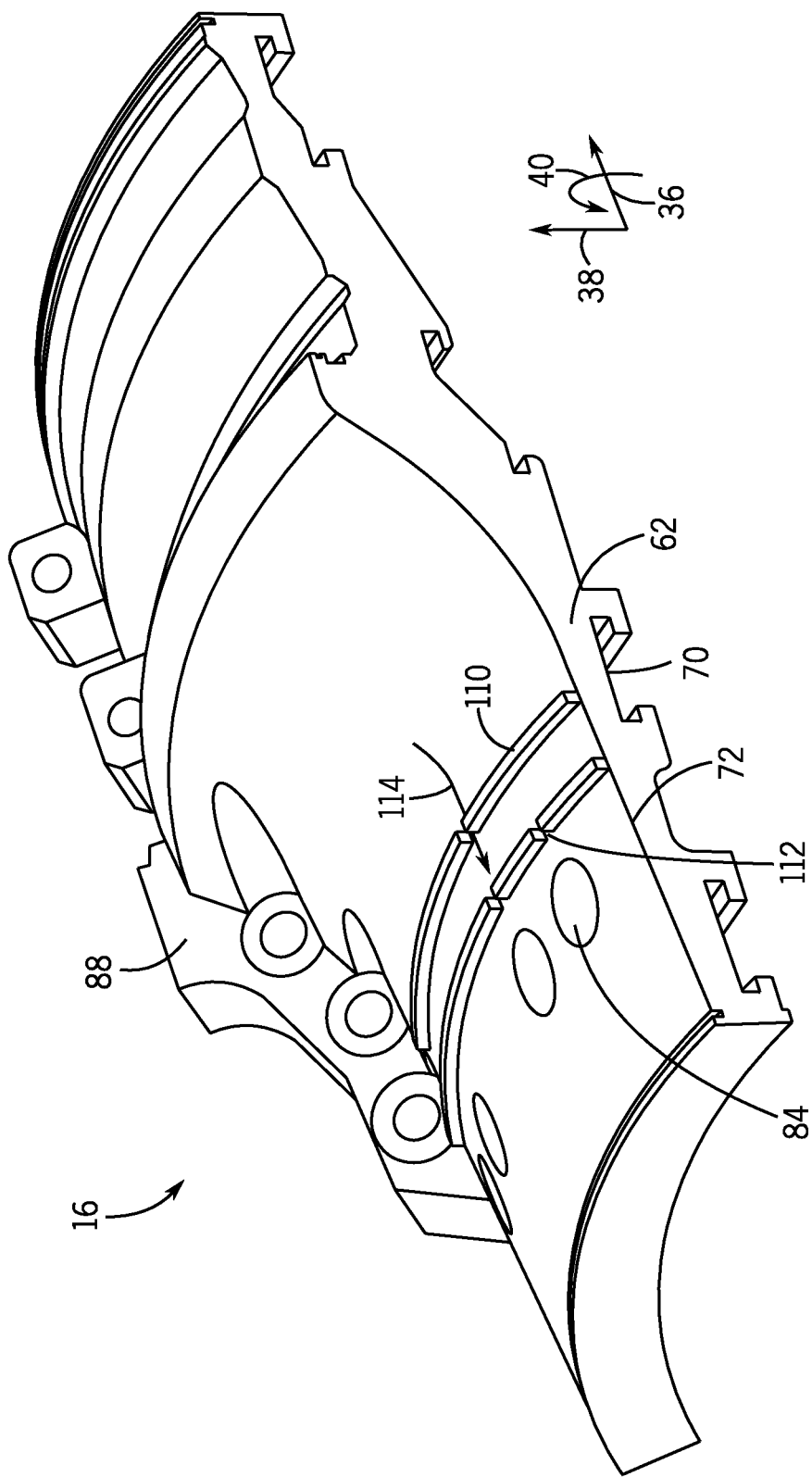
FIG. 7 is a perspective view of an embodiment of the inner casing having protrusions.

FIG. 7 is a perspective view of an embodiment of the inner casing 62 having multiple protrusions 110 (e.g., ribs, circumferential flow distributors or guides, etc.). The protrusions 110 may protrude radially 38 outwardly from the outer surface 72 of the inner casing 62 and may extend circumferentially 40 about the turbine 16. In certain embodiments, the protrusions 110 may extend circumferentially 40 between adjacent flanges 88 (e.g., a pair of flanges 88). As shown, the protrusions 110 may be generally parallel to one another and may be distributed (e.g., spaced) evenly with respect to the longitudinal axis 36 of the turbine 16 (e.g., constant axial offset), although any suitable arrangement and spacing of the protrusions 110 is envisioned. As noted above, the protrusions 110 may be disposed on the outer surface 72 of the inner casing 62, and the protrusions 110 may protrude (e.g., extend) radially 38 outwardly toward the outer casing 64 and/or into the cavity 66. In certain embodiments, the protrusions 110 may be disposed on the inner surface 74 of the outer casing 64 and may protrude (e.g., extend) radially 38 inwardly toward the inner casing 62 and/or into the cavity 66. The protrusions 110 may extend partially or fully between the inner casing 62 and the outer casing 64 (e.g., the protrusions 110 may contact one or both of the inner casing 62 and the outer casing 64). For example, the protrusions 110 may extend across 5% to 100%, 10% to 90%, 20% to 80%, 30% to 70%, 40% to 60%, 5% to 50%, or 10% to 30% of the distance (e.g., the distance D) between the inner casing 62 and the outer casing 64. If the protrusions 110 extend only partially between the inner casing 62 and the outer casing 64 (e.g., 5% to 30%), then the protrusions 110 causes less flow disturbance, while still providing a more uniform flow, for example.

In some embodiments, the protrusions 110 may include one or more slots 112 (e.g., apertures, holes, passageways, etc.) to enable air to flow past or through the protrusions 110 to the outlet 84 via the slots 112 (as shown by arrow 114). The slots 112 may be distributed circumferentially 40 about the turbine 16 in one or more protrusions 110, and the slots 112 may be distributed in various relative circumferential 40 and radial 38 positions along the protrusions 110. The slots 112 may be arranged in any suitable manner to affect and facilitate air flow within the cavity 66. More particularly, the slots 112 may help guide, condition, and distribute the air flow more evenly in the cavity 66.

Although two protrusions 110 are depicted, it should be understood than any suitable number of protrusions 110 may be employed. For example, 1, 2, 3, 4, 5, 6, 7, 8, 9, 10, or more protrusions 110 may be disposed within the cavity 66 at different locations along the longitudinal axis 36 of the turbine 16. Similarly, although two slots are depicted on a portion of the first protrusion 110 and three slots are depicted on a portion of the second protrusion 110, any suitable number of slots may be provided. For example, in some embodiments, approximately 1 to 50, 2 to 30, 3 to 20, 4 to 15, or 5 to 10 slots 112 may be disposed on each protrusion 110 extending about the turbine 16. Further, between each pair of flanges 88, each protrusion 110 may have 1, 2, 3, 4, 5, 6, 7, 8, 9, 10, or more slots 112. Regardless of the particular configuration and/or number of protrusions 110 and/or slots 112, the protrusions 110 and/or slots 112 are configured to affect and/or to control the velocity and/or direction of air within the cavity 66 to facilitate cooling of the outer surface 72 of the inner casing 62 and an inner surface 74 of the outer casing 64. For example, air that enters the cavity 66 through the inlet 80 may flow through the cavity 66 and contact the protrusions 110. The air flow may be affected by the presence of the protrusions 110, as the air may be directed to flow circumferentially along the protrusions 110 and/or in the longitudinal direction 36 through the slots 112. Additionally, although not depicted in FIG. 7, it should be understood that both protrusions 110 and false flanges 90 may be provided within the cavity 66.

Figure 8:
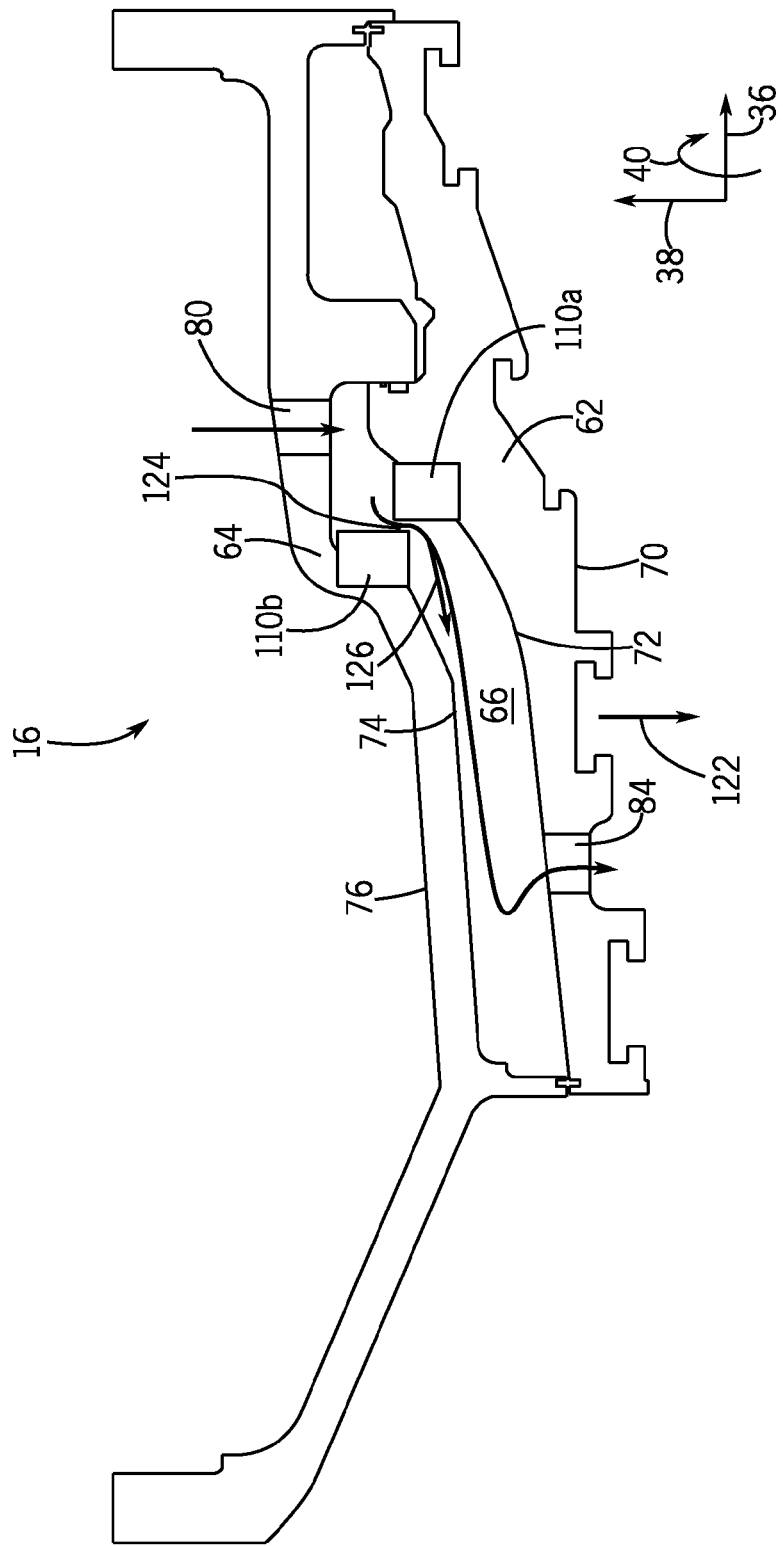
FIG. 8 is a side cross-sectional view of an embodiment of the inner casing and the outer casing having radially overlapping protrusions.

FIG. 8 is a cross-sectional side view of an embodiment of the inner casing 62 and the outer casing 64 having overlapping protrusions 110a, 110b. As shown, the inner casing 62 may have a first protrusion 110a that extends radially 38 outwardly from the outer surface 72 of the inner casing 62. The outer casing 64 may have a second protrusion 110b that extends radially 38 inwardly from the inner surface 74 of the outer casing 64. The protrusions 110a, 110b may extend circumferentially 40 about their respective casings 62, 64 and may extend circumferentially 40 between adjacent flanges 88 (e.g., a pair of flanges 88), in a similar manner as the protrusions 110 depicted in FIG. 7. In other embodiments, the protrusions 110a, 110b extend only partially between adjacent flanges 88. The protrusions 110a, 110b may radially overlap (e.g., overlap in a radial direction 38), but may provide a gap 124 (e.g., an axial gap) along the longitudinal axis 36 to enable air to flow between and/or past the protrusions 110a, 110b to the outlet 84 as shown by arrow 126. The gap 124 may have any suitable width (e.g., dimension along the longitudinal axis 36). For example, the width of the gap 124 may be approximately 0.5 cm, 1 cm, 2 cm, 3 cm, or more. As noted above, the protrusions 110a, 110b may include one or more slots 112. Although only two protrusions 110a, 110b (e.g., one pair of overlapping protrusions 110a, 110b) are illustrated in FIG. 8, any suitable number of overlapping protrusions 110a, 110b may be provided in the cavity 66 between the inner casing 62 and the outer casing 64. Further, three or more overlapping protrusions 110a, 110b (e.g., a group of overlapping protrusions 110a, 110b) may be provided in series, adjacently spaced along the longitudinal axis 36. Such groups of overlapping protrusions 110a, 110b may direct air through a series of adjacent gaps 124. For example, 1, 2, 3, 4, 5, 6, 7, 8, 9, 10, 11, 12, 13, 14, 15, 16, 17, 18, 19, 20, or more overlapping protrusions 110a, 110b may be provided about the turbine 16. Similarly, 1, 2, 3, 4, 5, 6, 7, 8, 9, 10, 11, 12, 13, 14, 15, 16, 17, 18, 19, 20, or more gaps 124 may be provided about the turbine 16 at any suitable spacing with respect to the longitudinal axis 36. Regardless of the particular configuration and/or number of overlapping protrusions 110a, 110b in the cavity 66 between the inner casing 62 and the outer casing 64, each pair or group of overlapping protrusions 110a, 110b is configured to change the velocity and/or direction of an air flow within the cavity 66 to facilitate heat transfer along the outer surface 72 of the inner casing 62 and an inner surface 74 of the outer casing 64. Additionally, although not depicted in FIG. 8, it should be understood that both protrusions 110, overlapping protrusions 110a, 110b, and false flanges 90 may be provided within the cavity 66.

Figure 9:
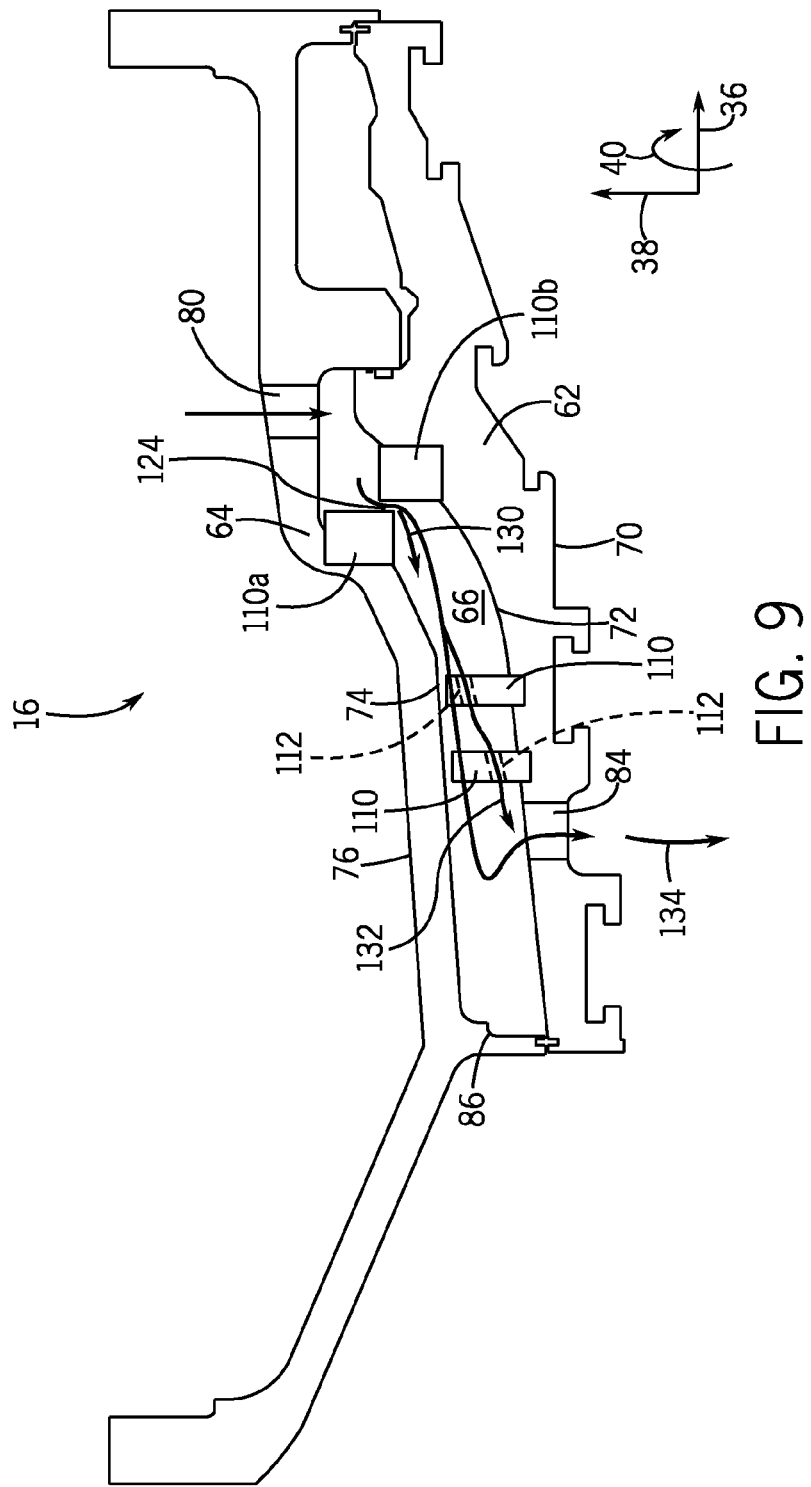
FIG. 9 is a side cross-sectional view of an embodiment of the inner casing and the outer casing having a combination of protrusions and radially overlapping protrusions.

FIG. 9 is a cross-sectional side view of an embodiment of the inner casing 62 and the outer casing 64 having both protrusions 110 and overlapping protrusions 110a, 110b. As shown, the overlapping protrusions 110a, 110b may be provided proximal to the first end 82 of the cavity 66 and protrusions 110 may be provided proximal to the second end 86 of the cavity 66, although the opposite relative placement is also envisioned. Such a combination of features may affect the flow of air within the cavity 66. In particular, the air may flow into the cavity 66 from the inlet 80 through the gap 124 between the overlapping protrusions 110a, 110b as shown by arrow 130. The air may then flow from the overlapping protrusions 110a, 110b toward the protrusions 110, where the air may be directed through the slots 112 disposed within the protrusions 110 as shown by arrow 132. The air may finally exit the cavity 66 through outlet 84 as shown by arrow 134. Additionally, although two protrusions 110 and one pair of overlapping protrusions 110a, 110b are illustrated, any suitable number of these features may be provided within the cavity 66. Similarly, any suitable number, combination, and/or configuration of any of the features (e.g., false flanges 90) described herein may be added or incorporated to affect and/or to control air flow within the cavity.

Figure 10:
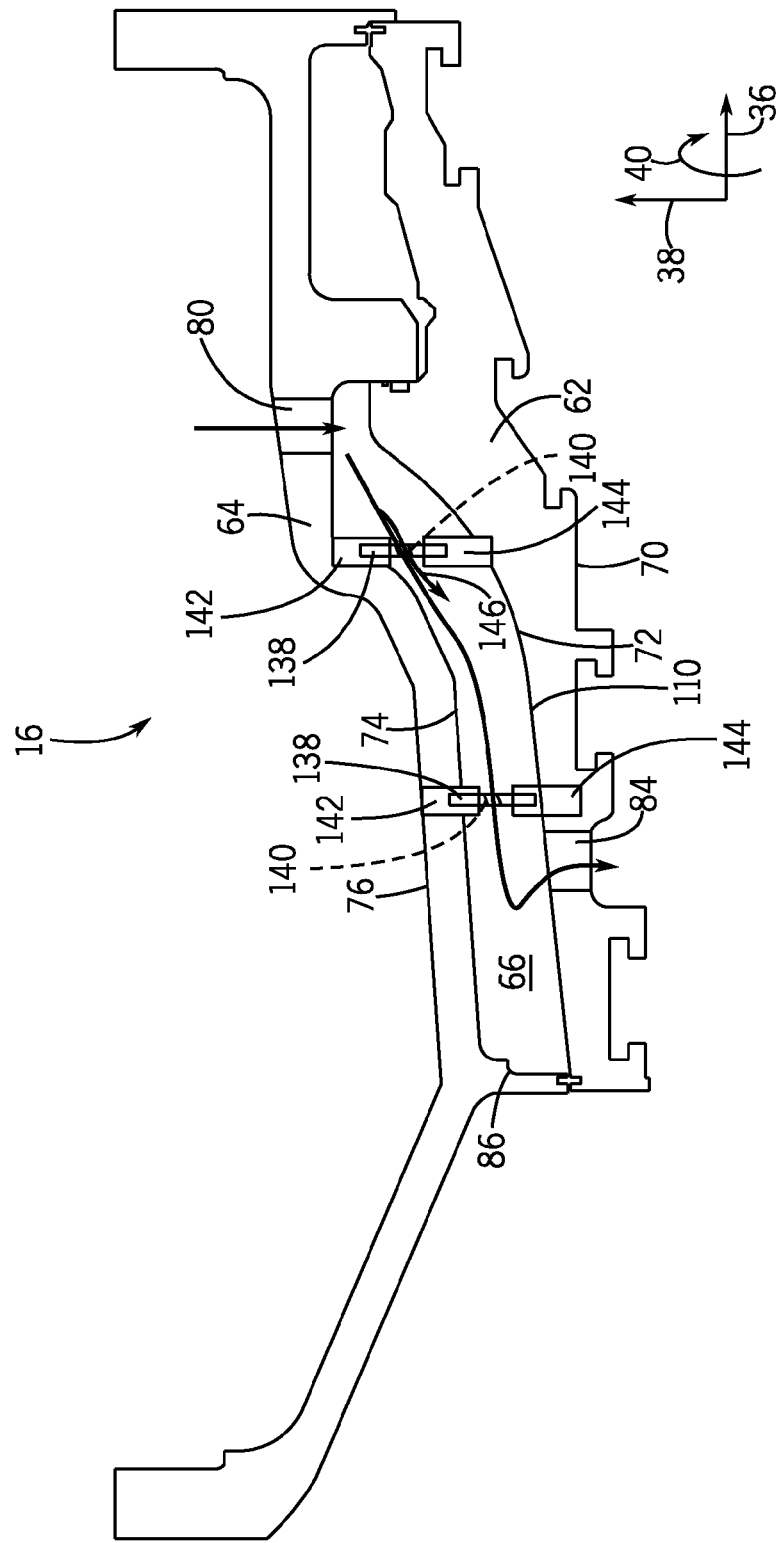
FIG. 10 is a side cross-sectional view of an embodiment of the inner casing and the outer casing having multiple perforated plates extending between the inner casing and the outer casing.

FIG. 10 illustrates a cross-sectional side view of an embodiment of a perforated plate 138 having multiple perforations 140 (e.g., a pattern of openings) extending between the inner casing 62 and the outer casing 64. The perforated plate 138 and the perforations 140 may be generally orthogonal with respect to the outer surface 72 of the inner casing 62 and the inner surface 74 of the outer casing 64. However, in certain embodiments, the perforated plate 138 and/or the perforations 140 may be angled (e.g., an angle other than 90 degrees) with respect to the surfaces 72, 74 of the casings 62, 64. In some embodiments, the perforated plate 138 and/or the perforations 140 may be at an angle of 10 to 90, 20 to 80, 30 to 70, 40 to 60, 30, 45, 60, 75, or 90 degrees with respect to the surfaces 72, 74 of the casings 62, 64. In certain embodiments, multiple perforated plates 138 may be provided within the cavity 66. As shown, two perforated plates 138 are provided. Each perforated plate may directly contact one or both of the outer surface 72 of the inner casing 62 or the inner surface 74 of the outer casing 64. Each perforated plate 138 may generally extend circumferentially 40 about the longitudinal axis 36 of the turbine 16 and may extend circumferentially 40 between adjacent flanges 88 (e.g., a pair of flanges 88). In certain embodiments, a first bracket 142 and a second bracket 144 may be provided to support the perforated plate 138 within the cavity 66. More particularly, in some embodiments, the first bracket 142 may be coupled to and may extend radially 38 inward from the inner surface 74 of the outer casing 64, and/or the second bracket 144 may be coupled to and may extend radially 38 outward from the outer surface 72 of the inner casing 62. The brackets 142, 144 may be removably coupled to the surface 72, 74 of the casings 62, 64, or the brackets 142, 144 may be permanently affixed or attached to the surfaces 72, 74 of the casings 62, 64. In operation, air may flow from the inlet 80 through and past the perforated plate 138 as shown by arrow 146 toward the outlet 84.

As noted above, the brackets 142, 144 may generally support the perforated plate 138 within the cavity 66. In some embodiments, the perforated plate 138 may be removable. In other words, the perforated plate 138 may be accessed within the cavity 66, disengaged from the brackets 142, 144 (or the brackets 142, 144 may be removed with the perforated plate), and removed from the cavity 66. The perforated plates 138 may be inserted or removed to adapt and tune the cooling properties and air flow characteristics within the cavity 66. For example, in certain applications, fewer or more perforated plates 138, or perforated plates 138 having fewer or more perforations 138, may be desirable. It should be understood that other features (e.g., false flanges 90, protrusions 110, overlapping protrusions 110*a*, 110*b*) may also be configured to be removable in certain embodiments. Additionally, although two perforated plates 138 are depicted, any suitable number of perforated plates 138 may be provided within the cavity 66. For example, 1, 2, 3, 4, 5, 6, 7, 8, 9, 10, 11, 12, 13, 14, 15, 16, 17, 18, 19, 20, or more perforated plates 138 may be provided.

Figure 11:
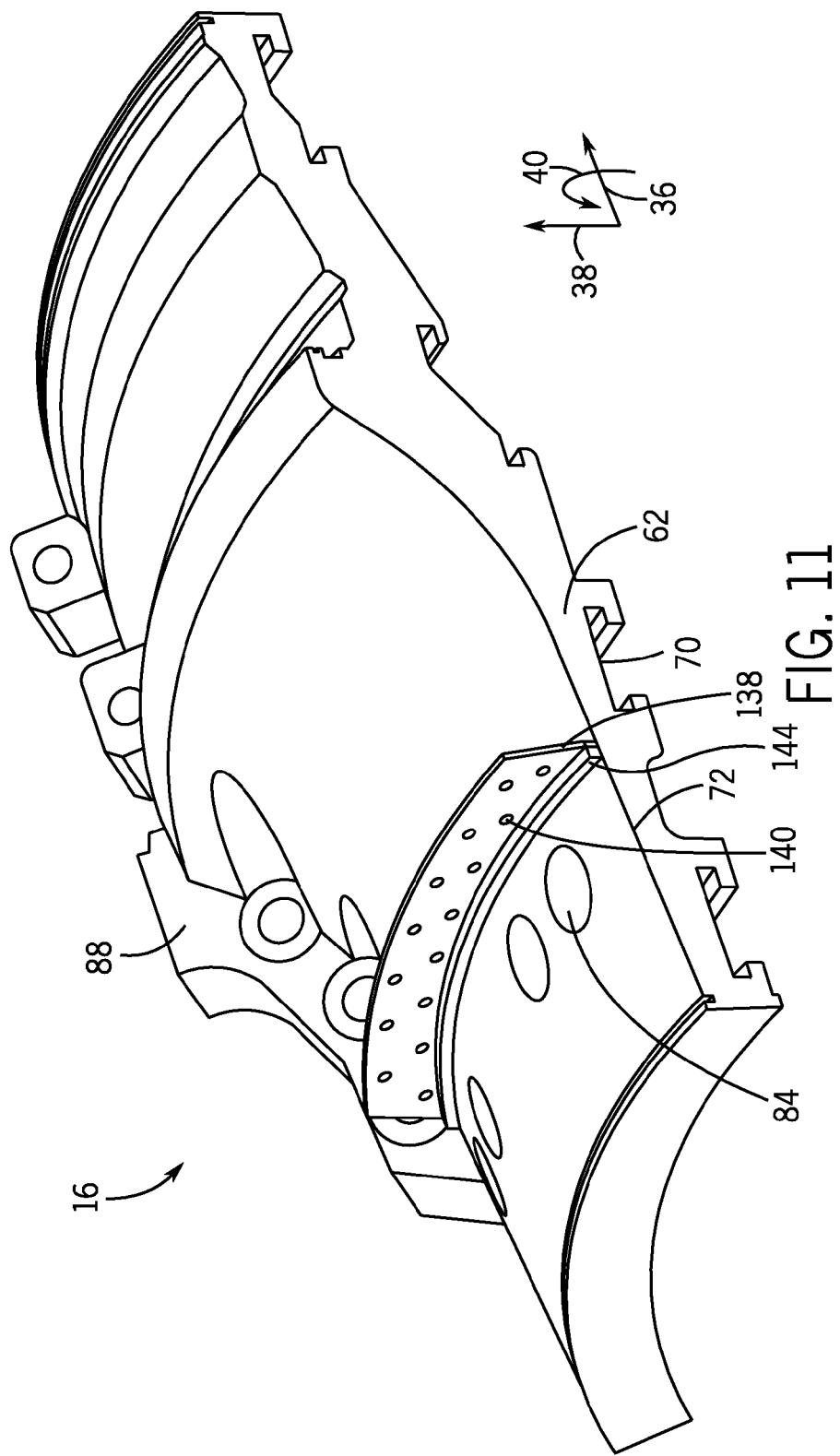
FIG. 11 is a partial perspective view of an embodiment of the inner casing having one perforated plate.

FIG. 11 illustrates a perspective view of an embodiment of the inner casing 62 coupled to the perforated plate 138. In particular, the perforations 140 (e.g., apertures, holes, passageways, etc.) are illustrated. The perforations 140 may extend through the perforated plate 138 to enable air to flow through the perforated plate 138 as discussed above with respect to FIG. 10. Any suitable number of perforations 140 may be provided in the perforated plate 138, and the perforations 140 may be arranged in any particular configuration. For example, approximately 5, 10, 15, 20, 25, 30, or more perforations 140 may be disposed on each perforated plate 138 between each pair of flanges 88. Regardless of the particular configuration and/or number of perforated plates 138 and/or number of perforations 140, each perforated plate 138 may be configured to change the velocity and/or direction of an air flow within the cavity 66 to facilitate cooling of the outer surface 72 of the inner casing 62 and an inner surface 74 of the outer casing 64. Additionally, although not depicted in FIGS. 10 and 11, it should be understood that any suitable number of features (e.g., protrusions 110, overlapping protrusions 110*a*, 110*b*, and false flanges 90) may be provided in addition (e.g., in combination with) perforated plates 138 within the cavity 66.

FIGS. 3-11 generally illustrate portions of the inner casing 62 and/or the outer casing 64 of the turbine section 44 of the gas turbine system 10. The inner casing 62 and the outer casing 64 are configured to circumferentially surround at least a portion of the turbine 16, and the inner casing 62 and the outer casing 64 define the cavity 66. As noted above, regardless of the particular configuration and/or number of features, the geometry (e.g., volume, shape, etc.) of the cavity 66 and/or the various features within the cavity 66 may be configured to change the velocity and/or direction of an air flow within the cavity 66 to improve heat transfer along the outer surface 72 of the inner casing 62 and an inner surface 74 of the outer casing 64. The geometry of the cavity 66 and the various features described herein may affect the air flow and/or provide additional surface area to facilitate heat transfer within the cavity 66, which in turn may increase the heat transfer coefficient within the cavity 66. The amount of heat exchanged between the walls of the cavity 66 (e.g., the outer surface 72 of the inner casing 62 and the inner surface 74 of the inner casing 64) and the various features (e.g., flanges 88, false flanges 90, protrusions 110, overlapping protrusions 120, and/or perforated plates 138) is increased, facilitating cooling of the outer surface 72 of the inner casing 62 and the inner surface 74 of the inner casing 64. In some cases, the geometry of the cavity 66 and/or the features described herein may facilitate cooling of the cavity 66 without the need for flow sleeves and/or impingement plates, thus lowering the complexity and/or the cost of cooling the gas turbine system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gas turbine engine, comprising:
a combustion section;
a turbine section coupled to the combustion section, wherein the turbine section comprises a plurality of turbine stages having a plurality of turbine blades coupled to a rotor, an inner casing circumferentially disposed about the plurality of turbine blades, and an outer casing circumferentially disposed about at least a portion of the inner casing, wherein the inner casing and the outer casing define a cavity between the inner casing and the outer casing, wherein the cavity comprises a volume extending between a forward portion and an aft portion to facilitate distribution of air within the cavity to cool an outer surface of the inner casing and an inner surface of the outer casing, wherein the forward portion is closer to the combustion section than the aft portion, wherein the cavity extends axially in a longitudinal direction of the turbine section to surround respective portions of at least two turbine stages of the plurality of turbine stages, wherein the outer surface of the inner casing comprises a curved portion that gradually curves inwardly toward a longitudinal axis of the gas turbine engine in an upstream direction relative to a flow of a working fluid in the gas turbine engine and the curved portion extends axially in the longitudinal direction of the turbine section to surround respective portions of the at least two turbine stages of the plurality of turbine stages, wherein the outer casing comprises at least one air inlet for the air to flow into the aft portion of the cavity, and the inner casing comprises at least one air outlet for the air to flow out of the forward portion of the cavity directly into a turbine nozzle; and
at least one flange disposed within the cavity, wherein the at least one flange flanks the at least one air inlet and at least one flow guide, wherein the at least one flange and a first flow guide of the at least one flow guide extend axially in the longitudinal direction of the turbine section along at least a portion of the outer surface of the inner casing, and wherein the at least one flow guide is configured to change a velocity or a direction of an air flow within the cavity to facilitate heat transfer along the outer surface of the inner casing and the inner surface of the outer casing.

2. The system of claim 1, comprising at least one protrusion of the at least one flow guide disposed on the outer surface of the inner casing and extending circumferentially about the inner casing, wherein the at least one protrusion is configured to facilitate distribution of the air flow within the cavity.

3. The system of claim 2, wherein at least one slot is disposed within the at least one protrusion to facilitate distribution of the air flow within the cavity.

4. The system of claim 1, comprising a first protrusion of the at least one flow guide extending radially into the cavity from the inner surface of the outer casing and a second protrusion of the at least one flow guide extending radially into the cavity from the outer surface of the inner casing, wherein the first and second protrusions radially overlap and are axially offset along the longitudinal direction of the turbine section to form a gap configured to enable the air flow between the first and second protrusions from the aft portion toward the forward portion of the cavity.

5. The system of claim 1, comprising at least one perforated plate of the at least one flow guide extending between the inner casing and the outer casing.

6. The system of claim 5, wherein a first end of the at least one perforated plate is coupled to a first bracket disposed on the inner surface of the outer casing and a second end of the at least one perforated plate is coupled to a second bracket disposed on the outer surface of the inner casing.

7. The system of claim 1, wherein the cavity comprises one or more flow guides of the at least one flow guide extending in an axial direction, a radial direction, a circumferential direction, or a combination thereof, relative to the longitudinal direction of the turbine section.

8. The system of claim 1, wherein the cavity comprises a pair of flanges of the at least one flange flanking the at least one air inlet and a pair of flow guides of the at least one flow guide.

9. The system of claim 1, wherein an orthogonal distance between the outer surface of the inner casing and the inner surface of the outer casing varies by between 0% and 10% along a length of the cavity between the at least one air inlet and the at least one air outlet.

10. The system of claim 1, wherein the cavity extends axially to surround respective portions of at least three turbine stages of the plurality of turbine stages.

11. The system of claim 1, wherein a first axial end of the cavity is located on a first side of one turbine stage of the at least two turbine stages of the plurality of turbine stages, and a second axial end of the cavity is located on a second side of the one turbine stage along the longitudinal axis, such that the cavity extends axially across an entire axial length of the one turbine stage.

12. A system, comprising:
a cooling assembly for a turbine section of a gas turbine comprising a plurality of turbine stages, the cooling assembly comprising:
an inner casing having a first inner surface and a first outer surface, the inner casing being circumferentially disposed about a portion of the turbine section of the gas turbine;
an outer casing having a second inner surface and a second outer surface, the outer casing being circumferentially disposed about at least a portion of the inner casing; and
a cavity defined by the first outer surface of the inner casing and the second inner surface of the outer casing, the cavity extending axially in a longitudinal direction of the turbine section to surround respective portions of at least two turbine stages of the plurality of turbine stages, the cavity having a volume configured to facilitate an air flow within the cavity to cool the first outer surface of the inner casing and the second inner surface of the outer casing, wherein the first outer surface of the inner casing comprises a curved portion that gradually curves inwardly toward a longitudinal axis of the gas turbine in an upstream direction relative to a flow of a working fluid in the gas turbine and the curved portion extends axially in the longitudinal direction to surround respective portions of the at least two turbine stages of the plurality of turbine stages;
at least one inlet configured to receive air proximate to a first end of the cavity, the at least one inlet being distributed circumferentially about the cavity;
a plurality of outlets configured to exhaust air directly into a turbine nozzle proximate to a second end of the cavity, the outlets being distributed circumferentially about the cavity; and
a plurality of flanges extending axially in the longitudinal direction of the turbine section along at least a portion of the first outer surface of the inner casing, wherein each of pairs of adjacent flanges of the plurality of flanges flank at least two flow guides.

13. The system of claim 12, wherein the second inner surface of the outer casing gradually curves inwardly toward the longitudinal axis of the gas turbine in the upstream direction relative to the flow of the working fluid in the gas turbine.

14. The system of claim 13, wherein an orthogonal distance between the first outer surface of the inner casing and the second inner surface of the outer casing varies by between 0% and 10% along a length of the cavity between the at least one inlet and the plurality of outlets.

15. The system of claim 12, comprising at least one protrusion of the at least two flow guides disposed on the first outer surface of the inner casing and extending circumferentially around the inner casing, wherein the at least one protrusion is configured to facilitate distribution of the air flow within the cavity.

16. The system of claim 12, comprising a first protrusion of the at least two flow guides extending radially into the cavity from the second inner surface of the outer casing and a second protrusion of the at least two flow guides extending radially into the cavity from the first outer surface of the inner casing, wherein the first and second protrusions radially overlap and are axially offset relative to the longitudinal direction of the turbine section to form a gap configured to enable the air flow between the first and second protrusions from the first end toward the second end of the cavity.

17. The system of claim 12, comprising at least one perforated plate of the at least two flow guides extending between the inner casing and the outer casing, wherein the at least one perforated plate is configured to enable the air flow to flow through the at least one perforated plate from the first end toward the second end of the cavity.

18. A method comprising:
routing air through an inlet disposed proximate a first end of a cavity formed between an inner casing and an outer casing of a turbine section of a gas turbine, wherein the cavity extends axially in a longitudinal direction of the turbine section to surround respective portions of at least two turbine stages of the turbine section, and the cavity has a volume configured to facilitate cooling of the inner casing and the outer casing;
routing the air around a plurality of surface features disposed within the cavity, wherein the surface features include at least one flow guide extending axially along an outer surface of the inner casing in the longitudinal direction of the turbine section, the at least one flow guide being flanked by at least two flanges, wherein the outer surface of the inner casing comprises a curved portion that gradually curves inwardly toward a longitudinal axis of the gas turbine in an upstream direction relative to a flow of a working fluid in the gas turbine and the curved portion extends axially in the longitudinal direction to surround respective portions of the at least two turbine stages; and routing the air through at least one outlet disposed proximate to a second end of the cavity directly into a turbine nozzle.

19. The method of claim 18, wherein an inner surface of the outer casing gradually turns inwardly toward the longitudinal axis of the gas turbine in the upstream direction relative to the flow of the working fluid in the turbine section of the gas turbine.

20. The method of claim 19, wherein routing the air around the plurality of surface features comprises controlling the air flow to control radial and axial clearances in the turbine section of the gas turbine.

* * * * *